US011331739B2

(12) United States Patent
Perret et al.

(10) Patent No.: US 11,331,739 B2
(45) Date of Patent: May 17, 2022

(54) AUTO-ADAPTIVE BRAZE DISPENSING SYSTEMS AND METHODS

(71) Applicant: Raytheon Technologies Corporation, Farmington, CT (US)

(72) Inventors: Edmundo Jesus Perret, Grand Prairie, TX (US); Paul M. Pellet, Arlington, TX (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/000,115

(22) Filed: Aug. 21, 2020

(65) Prior Publication Data

US 2020/0384561 A1  Dec. 10, 2020

Related U.S. Application Data

(62) Division of application No. 15/963,230, filed on Apr. 26, 2018, now Pat. No. 10,780,515.

(51) Int. Cl.
*B23K 3/00* (2006.01)
*B23K 1/00* (2006.01)
*B23K 3/08* (2006.01)
*B23K 35/02* (2006.01)
(Continued)

(52) U.S. Cl.
CPC ............ *B23K 1/0018* (2013.01); *B23K 3/087* (2013.01); *B23K 35/025* (2013.01); *B23K 35/304* (2013.01); *B23K 2101/001* (2018.08); *F05D 2230/237* (2013.01)

(58) Field of Classification Search
CPC .... B23K 1/0018; B23K 3/087; B23K 35/025; B23K 35/304; B23K 2101/001; B23K 3/0607; B23K 3/08; B23K 1/19; F05D 2230/237
See application file for complete search history.

(56) References Cited

U.S. PATENT DOCUMENTS

| 2,651,276 A | 9/1953 | Kristen |
| RE24,020 E | 6/1955 | Kristen |
| 3,497,951 A | 3/1970 | Reighter |

(Continued)

FOREIGN PATENT DOCUMENTS

| CN | 106984880 | 7/2017 |
| CN | 206952321 | 2/2018 |

(Continued)

OTHER PUBLICATIONS

European Patent Office, European Search Report dated Nov. 12, 2019 in Application No. 19171181.1.
(Continued)

*Primary Examiner* — Kiley S Stoner
(74) *Attorney, Agent, or Firm* — Snell & Wilmer L.L.P.

(57) ABSTRACT

Systems and methods for moving a substrate to a vision system using a robot; using the vision system to determine where a braze material is to be applied to the substrate; moving the substrate to a braze dispenser using the robot; applying a braze material to the substrate using the braze dispenser based on the determination from the vision system; and using the vison system to determine whether to apply additional braze to the substrate, including for the substrate of a component for gas turbine engine, such as configured for use in an aircraft.

8 Claims, 4 Drawing Sheets

(51) Int. Cl.
*B23K 35/30* (2006.01)
*B23K 101/00* (2006.01)

(56) References Cited

U.S. PATENT DOCUMENTS

| | | | |
|---|---|---|---|
| 3,525,151 A | 8/1970 | Pellerin | |
| 3,680,762 A | 8/1972 | Silver | |
| 4,377,024 A | 3/1983 | Saperstein | |
| 4,465,014 A | 8/1984 | Bajka | |
| 4,530,456 A | 7/1985 | Michelotti | |
| 4,703,558 A | 11/1987 | Mantani | |
| 4,704,305 A | 11/1987 | Berger | |
| 4,796,560 A | 1/1989 | Berger | |
| 4,832,250 A | 5/1989 | Spigarelli | |
| 4,928,387 A | 5/1990 | Mather | |
| 5,122,635 A | 6/1992 | Knodler et al. | |
| 5,125,555 A | 6/1992 | Grisoni et al. | |
| 5,297,716 A | 3/1994 | Smith | |
| 5,356,066 A | 10/1994 | Yamada | |
| 5,364,011 A | 11/1994 | Baker et al. | |
| 5,411,897 A | 5/1995 | Harvey et al. | |
| 5,421,504 A | 6/1995 | Spirig | |
| 5,437,737 A | 8/1995 | Draghi et al. | |
| RE35,098 E | 11/1995 | Saperstein | |
| 5,478,004 A | 12/1995 | Lee | |
| 5,500,512 A * | 3/1996 | Goldblatt | B23K 9/1333 228/102 |
| 5,525,777 A | 6/1996 | Kukuljan | |
| 5,542,600 A | 8/1996 | Kobayashi et al. | |
| 5,609,292 A | 3/1997 | Kohn | |
| 5,620,927 A | 4/1997 | Lee | |
| 5,735,448 A | 4/1998 | Draghi et al. | |
| 5,806,751 A | 9/1998 | Schaefer | |
| 5,878,911 A | 3/1999 | Lin | |
| 6,199,746 B1 | 3/2001 | Dupree et al. | |
| 6,357,649 B1 | 3/2002 | Okatsu | |
| 6,369,359 B1 | 4/2002 | Morrison | |
| 6,405,918 B1 | 6/2002 | Claridge et al. | |
| 6,530,971 B1 | 3/2003 | Cohen et al. | |
| 6,575,349 B2 | 6/2003 | Van Esch | |
| 6,826,328 B2 | 11/2004 | Hwang | |
| 7,549,568 B1 * | 6/2009 | Chen | B23K 20/004 228/180.5 |
| 7,555,359 B2 * | 6/2009 | Badarinarayan | B23K 20/123 228/201 |
| 8,640,942 B1 | 2/2014 | Ozbaysal et al. | |
| 2001/0045009 A1 | 11/2001 | Cachina | |
| 2002/0047039 A1 | 4/2002 | Mawatari | |
| 2003/0010813 A1 | 1/2003 | Nakaya | |
| 2003/0080108 A1 | 5/2003 | Yamauchi | |
| 2004/0020562 A1 | 2/2004 | Wetz | |
| 2004/0200880 A1 | 10/2004 | Van Den Broek et al. | |
| 2004/0226979 A1 | 11/2004 | Sato | |
| 2004/0226985 A1 | 11/2004 | Fukunaka | |
| 2005/0067466 A1 | 3/2005 | Boegli et al. | |
| 2005/0139638 A1 | 6/2005 | Chien et al. | |
| 2005/0205642 A1 * | 9/2005 | Kim | B23K 1/0016 228/8 |
| 2006/0169749 A1 * | 8/2006 | Cooper | B23K 20/10 228/144 |
| 2006/0219330 A1 | 10/2006 | Hu et al. | |
| 2007/0034305 A1 | 2/2007 | Suh | |
| 2007/0039177 A1 | 2/2007 | Yoshioka et al. | |
| 2008/0009122 A1 | 1/2008 | Lee | |
| 2008/0083816 A1 | 4/2008 | Leinbach et al. | |
| 2008/0179298 A1 | 7/2008 | Nakayama | |
| 2008/0197170 A1 | 8/2008 | Prince | |
| 2008/0272112 A1 | 11/2008 | Urech | |
| 2009/0020588 A1 * | 1/2009 | Saito | H05K 3/3494 228/103 |
| 2009/0226292 A1 | 9/2009 | Habisreitinger | |
| 2009/0248201 A1 | 10/2009 | Habisreitinger | |
| 2010/0132873 A1 * | 6/2010 | Lang | B23K 31/12 156/64 |
| 2010/0204824 A1 * | 8/2010 | Luce | B25J 11/00 700/219 |
| 2010/0206854 A1 | 8/2010 | Nakai et al. | |
| 2010/0290860 A1 | 11/2010 | Wang | |
| 2012/0055975 A1 | 3/2012 | Wei et al. | |
| 2012/0228363 A1 | 9/2012 | Risch | |
| 2012/0288639 A1 | 11/2012 | Hanrieder | |
| 2013/0020377 A1 | 1/2013 | Stankowski et al. | |
| 2013/0043297 A1 | 2/2013 | Andrecheck et al. | |
| 2013/0180107 A1 | 7/2013 | Woods et al. | |
| 2013/0202427 A1 | 8/2013 | Macelroy | |
| 2013/0272882 A1 | 10/2013 | Mittendorf et al. | |
| 2014/0014648 A1 * | 1/2014 | Avila | B23K 1/0012 219/617 |
| 2014/0076956 A1 | 3/2014 | Lu | |
| 2014/0209661 A1 | 7/2014 | Hsieh | |
| 2014/0263578 A1 * | 9/2014 | Youngquist | H05K 13/0409 228/103 |
| 2015/0108202 A1 | 4/2015 | Deng et al. | |
| 2015/0273604 A1 | 10/2015 | Anderson et al. | |
| 2015/0289426 A1 | 10/2015 | Mantani et al. | |
| 2015/0298233 A1 * | 10/2015 | Dreikorn | B23K 1/20 228/102 |
| 2015/0360328 A1 | 12/2015 | Li et al. | |
| 2016/0031044 A1 | 2/2016 | Marino et al. | |
| 2016/0039053 A1 * | 2/2016 | Becker | B23K 37/00 228/102 |
| 2016/0045971 A1 * | 2/2016 | Holverson | G06F 21/35 219/132 |
| 2016/0139587 A1 * | 5/2016 | Jarvis | B23K 37/0426 700/186 |
| 2016/0144465 A1 | 5/2016 | Ivory et al. | |
| 2016/0353583 A1 | 12/2016 | Hippin et al. | |
| 2017/0002849 A1 | 1/2017 | Wang | |
| 2017/0028495 A1 | 2/2017 | Jin et al. | |
| 2017/0028496 A1 | 2/2017 | Jin et al. | |
| 2017/0028512 A1 | 2/2017 | Jin | |
| 2017/0029052 A1 | 2/2017 | Jin | |
| 2017/0089530 A1 | 3/2017 | Jiang | |
| 2017/0120362 A1 | 5/2017 | Reid | |
| 2017/0170337 A1 | 6/2017 | Yang | |
| 2017/0173719 A1 | 6/2017 | Nguyen et al. | |
| 2018/0036820 A1 | 2/2018 | Takazane | |
| 2018/0056459 A1 | 3/2018 | Bruck | |
| 2018/0320831 A1 | 11/2018 | Li et al. | |
| 2019/0047049 A1 | 2/2019 | Fujieda et al. | |
| 2019/0047094 A1 | 2/2019 | Puidokas | |
| 2019/0104659 A1 | 4/2019 | Teraoka | |
| 2019/0176256 A1 | 6/2019 | Otsubo et al. | |
| 2020/0094336 A1 | 3/2020 | Ikushima | |

FOREIGN PATENT DOCUMENTS

| | | |
|---|---|---|
| EP | 2837457 | 2/2015 |
| JP | S62173076 | 7/1987 |
| JP | 02200376 | 8/1990 |
| JP | 2008045956 | 2/2008 |

OTHER PUBLICATIONS

USPTO, Restriction Requirement dated Sep. 13, 2019 in U.S. Appl. No. 15/963,230.
USPTO, Pre-Interview First Office Action dated Oct. 11, 2019 in U.S. Appl. No. 15/963,230.
USPTO, First Action Interview Office Action dated Oct. 29, 2019 in U.S. Appl. No. 15/963,230.
USPTO, Final Office Action dated Jan. 21, 2020 in U.S. Appl. No. 15/963,230.
USPTO, Advisory Action dated Apr. 1, 2020 in U.S. Appl. No. 15/963,230.
USPTO, Non-Final Office Action dated May 1, 2020 in U.S. Appl. No. 15/963,230.
USPTO, Notice of Allowance dated Jun. 19, 2020 in U.S. Appl. No. 15/963,230.

* cited by examiner

AUTO-ADAPTIVE BRAZE DISPENSING SYSTEMS AND METHODS

CROSS-REFERENCE TO RELATED APPLICATIONS

This application is a divisional of, and claims priority to, and the benefit of U.S. Non-Provisional application Ser. No. 15/963,230, entitled "AUTO-ADAPTIVE BRAZE DISPENSING SYSTEMS AND METHODS," filed on Apr. 26, 2018, which is hereby incorporated by reference in its entirety.

FIELD

This disclosure relates to systems and methods for applying a braze material to a substrate, such as an aircraft engine component.

BACKGROUND

Brazing is technique used to join metals together by applying heat to melt and flow a braze material onto a substrate. Typically, the braze material has a lower melting point than the adjoining metals, and it is brought slightly above its melting temperature to melt and flow over the base metal in a technique called wetting, which fills in an opening in the substrate by capillary action to fill and/or close the opening. Appropriate capillary in-draw allows the braze material to bond with the metals and conjoin them as one.

Various types of engine and other components are used in working environments that are detrimental to the components—e.g., environments that reduce wall thickness and/or create cracks and holes in a substrate through corrosion, erosion, exposure to high operating temperatures, oxidation, thermal fatigue, etc. Accordingly, brazing can be used to rework a component into a desired configuration or geometry. Advantageously, the braze material can affect the material properties and/or shape of the substrate, thereby reducing production costs, allowing re-works, and extending the working life of various components.

SUMMARY

In various embodiments, a brazing system includes a vision system having a camera, a sensor, and a vision processor module; a braze dispenser having a braze head, a braze nozzle, and a braze processor module; a robot having an articulating arm; a control interface having an input device and an output device; and a processing module having a controller and memory configured to communicate with and control the vision system, the braze dispenser, the robot, and the control interface; wherein the vision system is configured to determine where the braze dispenser is to apply a braze material to a substrate and whether the braze dispenser is apply additional braze material to the substrate after an initial application.

In various embodiments: the processing module is configured to receive commands from the input device to communicate with and control the vision system, the braze dispenser, and the robot; and/or the processing module is configured to communicate with and control the articulating arm of the robot; and/or the processing module is configured to communicate with and control the articulating arm of the robot to place the substrate proximate the vision system; and/or the processing module is configured to communicate with and control the articulating arm of the robot to place the substrate proximate the braze dispenser; and/or the processing module is configured to communicate with and control the braze dispenser to apply the braze material to the substrate based on determinations from the vision system; and/or the substrate is a component of a gas turbine engine; and/or the gas turbine engine is configured for use in an aircraft.

In various embodiments, an automated method of applying a braze material to a substrate includes moving a substrate to a vision system using a robot; using the vision system to determine where a braze material is to be applied to the substrate; moving the substrate to a braze dispenser using the robot; applying a braze material to the substrate using the braze dispenser based on the determination from the vision system; and using the vison system to determine whether to apply additional braze material to the substrate.

In various embodiments: the braze dispenser applies the braze material to the substrate at approximately 0.011-0.11 pounds (5-50 grams) per minute; and/or the braze dispenser applies the braze material to the substrate at approximately 0.008-0.016 inches (0.2-0.4 millimeters) per pass; and/or a thickness of the applied braze material is approximately 0.01-0.06 inches (0.254-1.524 millimeters); and/or the braze dispenser applies the braze material to the substrate at a distance of approximately 0.049-0.059 inches (1.25-1.5 millimeters) away from the substrate; and/or the substrate is a component of a gas turbine engine; and/or the gas turbine engine is configured for use in an aircraft.

In various embodiments, an automated method of applying a braze material to a component of a gas turbine engine of an aircraft includes moving the component to a vision system using a robot; using the vision system to determine where a braze material is to be applied to the component; moving the component to a braze dispenser using the robot; applying a braze material to the component using the braze dispenser based on the determination from the vision system; and using the vison system to determine whether to apply additional braze material to the component.

In various embodiments: the braze dispenser applies the braze material to the component at approximately 0.011-0.11 pounds (5-50 grams) per minute; and/or the braze dispenser applies the braze material to the component at approximately 0.008-0.016 inches (0.2-0.4 millimeters) per pass; and/or a thickness of the applied braze material is approximately 0.01-0.06 inches (0.254-1.524 millimeters); and/or the braze dispenser applies the braze material to the component at a distance of approximately 0.049-0.059 inches (1.25-1.5 millimeters) away from the component.

BRIEF DESCRIPTION OF THE DRAWINGS

The accompanying drawings illustrate various embodiments employing the principles described herein and are a part of this specification. The illustrated embodiments are meant for description only, and they do not limit the scope of the claims, and in which:

FIG. 5 depicts a representative substrate, in various embodiments.

DETAILED DESCRIPTION

This detailed description of exemplary embodiments references the accompanying drawings, which show exemplary embodiments by way of illustration. While these exemplary embodiments are described in sufficient detail to enable those skilled in the art to practice this disclosure, it should be understood that other embodiments may be realized and that logical changes and adaptations in construction and design may be made in accordance with this disclosure and the teachings described herein without departing from the scope and spirit of this disclosure. Thus, this detailed description is presented for purposes of illustration only and not of limitation.

In accordance with various aspects of this disclosure, systems and methods are described for applying a braze material to a substrate. For example, a braze material can be applied to a combustion liner of gas turbine engine, such as one configured for use in an aerospace application.

Figure 1:
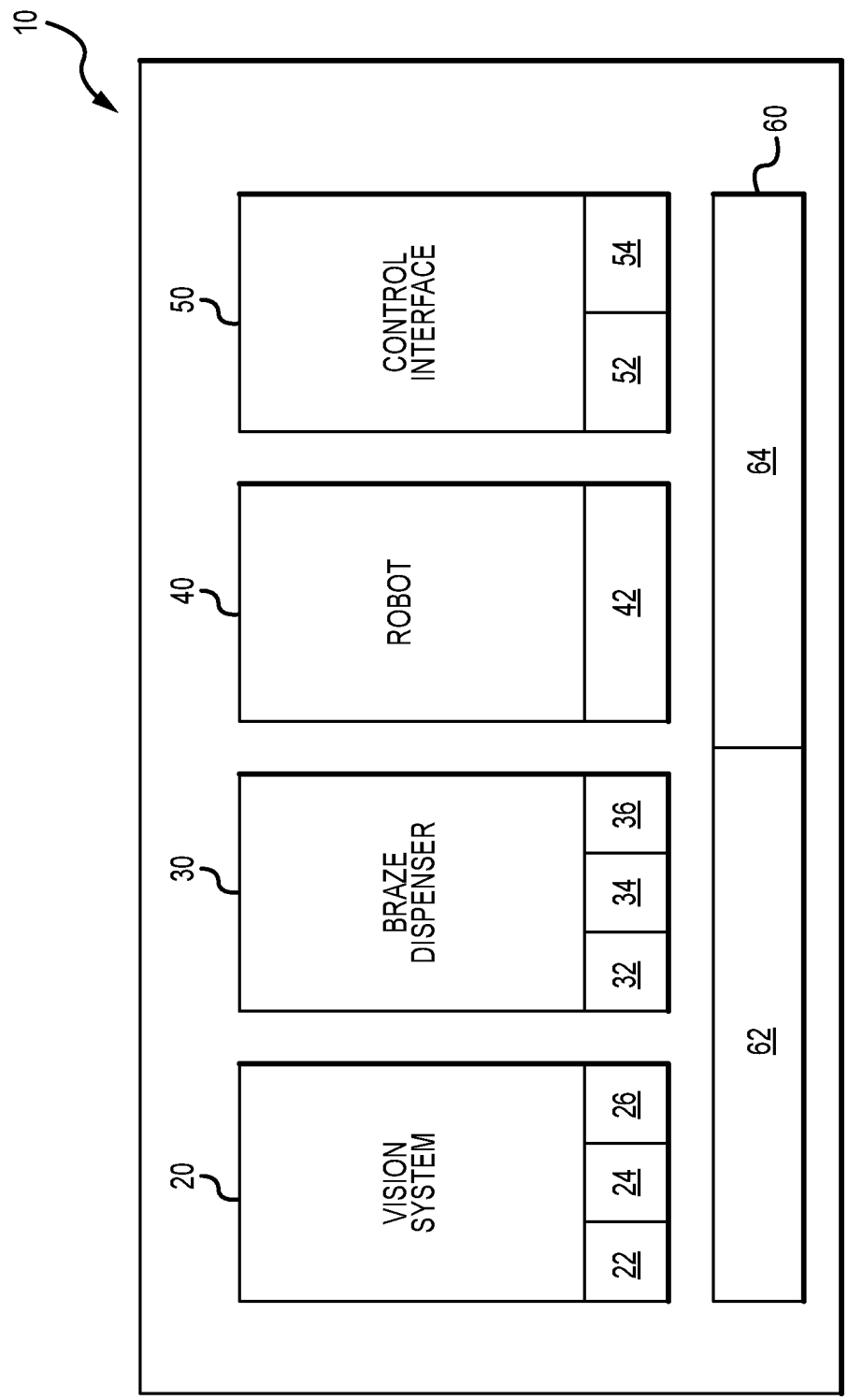
FIG. 1 is a simplified schematic representation of a brazing system according to the inventive arrangements, in various embodiments.
Figure 2:
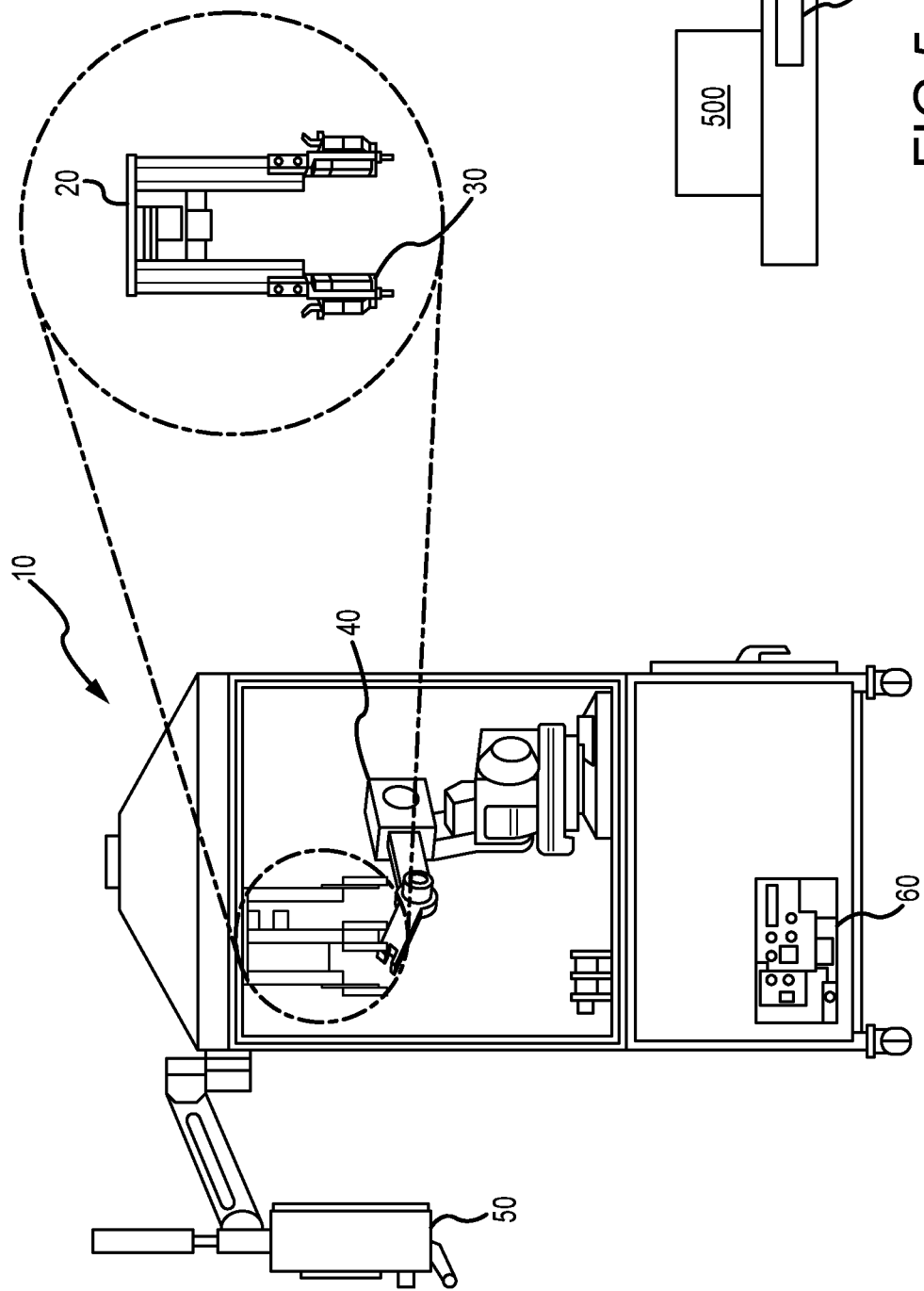
FIG. 2 is a partially perspective view of a brazing system, in various embodiments.

Referring now to FIGS. 1-2 and/or in various embodiments, a brazing system 10 comprises a vision system 20, a braze dispenser 30, a robot 40, and/or a control interface 50. In various embodiments, the brazing system also comprises a processing module 60—e.g., a microprocessor and a tangible, non-transitory memory—in electrical and/or RF communication with the vision system 20, the braze dispenser 30, the robot 40, and/or the control interface 50.

Referring to FIG. 1, and/or in various embodiments, the vision system 20 includes a camera 22, a sensor 24, and a vision processor module 26 comprising a processor and a tangible, non-transitory memory, each configured to operate together to recognize a region of a substrate to which a braze application is to be made—i.e., to which a braze material is to be applied. In various embodiments, the vision system 20 utilizes the camera 22 to identify a crack or hole in the substrate to which the braze material is to be applied, such as by identifying an outline of the crack or hole against an expected configuration, such as accessed and/or stored by the vision processor module 26 and/or the processing module 60. In various embodiments, the vision system 20 utilizes the sensor 24 and vision processor module 26 to analyze outputs from the camera 22 to detect or determine an outline of the crack or hole into which the braze material is to be flowed. For example, in various embodiments, the camera 22 obtains an image of the substrate, and the sensor 24 and/or vision processor module 26 determines from that image the outline of the crack or hole by detecting edges of the crack or hole and areas adjoining and/or around the crack or hole to determine the region of the substrate to which the braze material is to be applied. For example, in various embodiments, the sensor 24 senses the surface of the substrate, and the vision processor module 26 analyzes output(s) from the camera 22 and/or sensor 24 to determine the edges of the crack or hole. In various embodiments, these parameters are stored as a plurality of coordinates as related to the substrate.

If the vision system 20 is unable to locate all or any cracks or holes on the substrate in need of a braze application, then the robot 40 can default to cooling hole data provided at the control interface 50 and/or programmed into the processing module 60, in various embodiments.

In various embodiments, the camera 22 and/or sensor 24 and/or vision processor module 26 is/are also used to confirm an orientation and/or positon of the substrate prior to applying the braze material.

In various embodiments, the braze dispenser 30 includes a braze head 32, a braze nozzle 34, and a braze processor module 36 comprising a processor and a tangible, non-transitory memory, each configured to operate together to apply the braze material to the region of the substrate determined and/or identified by the vision system 20. In various embodiments, the braze material applied by the braze head 32 and braze nozzle 34 is a function of the substrate material. For example, in various embodiments, the braze material is an elemental material and/or metal—such as, for example, aluminum, boron, chromium, cobalt, copper, gold, hafnium, iron, magnesium, molybdenum, nickel, palladium, rhenium, silicon, silver, tantalum, tin, titanium, tungsten, zinc, zirconium, etc. In various embodiments, the braze material is an amalgamation, alloy, and/or superalloy of various materials and/or metals—such as, for example, various combinations of aluminum, boron, chromium, cobalt, copper, gold, hafnium, iron, magnesium, molybdenum, nickel, palladium, rhenium, silicon, silver, tantalum, tin, titanium, tungsten, zinc, zirconium, and/or other additives or adjuncts. In various embodiments, adhesive materials are added to the braze material to obtain desired properties thereof. In various embodiments, binder materials are added to the braze material to obtain desired properties thereof. In various embodiments, carrier materials are added to the braze material to obtain desired properties thereof. In various embodiments, filler materials are added to the braze material to obtain desired properties thereof.

In various embodiments, the braze dispenser 30 works with braze materials that are in coating, foil, liquid, paste, putty, slurry, solid (e.g., powdered), and/or tape forms.

In various embodiments, the braze material is brought to and/or held at a temperature above the melting temperature of the braze material, but below the melting temperature of the metals or materials being joined (i.e., the substrate), such as above or below 842 degrees Fahrenheit (450 degree Celsius), in various applications. For example, in various embodiments, the braze nozzle 34 is positioned proximate and/or held above a surface of the substrate to be joined and the temperature of the braze material is raised to and/or held at or above the melting temperature of the braze material (e.g., the braze temperature), but below the melting temperature of the substrate. The braze material thus becomes molten, wets adjacent surfaces of the substrate when applied thereto, and, through capillary action, is drawn into and fills in gaps in the substrate, in various embodiments. In various embodiments, the braze material cools and/or is cooled, by which the braze material solidifies and forms a strong metallurgical bond with the substrate at a brazement joint. In various embodiments, bonding occurs at molecular levels of the braze material and/or substrate. In various embodiments, the brazement joint provides a desired degree of serviceability under various temperatures, stresses, vibration loads, etc. In various embodiments, the braze joint is superior to the original substrate in various aspects.

In various embodiments, the vision system 20 is used to orient and/or confirm the orientation of the substrate prior to the braze application.

In various embodiments, the vision system 20 is used to inspect the braze application before, during, and/or after the braze application is completed.

In various embodiments, the braze process is repeated one or more times.

In various embodiments, the vision system 20 is used to determine if the braze process should be and/or is repeated one or more times.

In various embodiments, the braze dispenser 30 is controlled to apply an amount of braze material to the crack or hole corresponding to an amount and/or location as determined by the vision system 20 regarding the substrate.

In various embodiments, the vision system 20 is used to determine if the substrate should be and/or is subjected to a follow-up braze removal technique—e.g., grinding—following the braze application to remove any excess braze that may have occurred during the brazing application.

In various embodiments, the robot 40 includes an articulating arm 42 configured to gather, hold, move, pick, position, and/or release the substrate, including proximate and/or under the vision system 20 and/or the braze dispenser 30.

In various embodiments, the articulating arm 42 is configured to be movable according to a plurality of coordinate axes within and/or defined by the brazing system 10.

In various embodiments, the robot 40 is configured to be movable so that an operator operating the control interface 50 can manipulate and/or view the substrate within the brazing system 10.

In various embodiments, the articulating arm 42 is configured to be movable so that an operator operating the control interface 50 can manipulate and/or view the substrate within the brazing system 10.

In various embodiments, the articulating arm 42 is configured to be movable so that the vision system 20 inspects the substrate from multiple angles, axes, orientations, and/or views. For instance, the portion(s) of the substrate in need of brazing may be present in any number of locations and/or surfaces of the component. In addition, the portion(s) of the substrate in need of brazing may be present in any number of sizes and shapes on the component, in various embodiments.

In various embodiments, the articulating arm is the only and/or primary part of the brazing system 10 that moves, the vision system 20 and braze dispenser 30 otherwise being stationary, in various embodiments.

In various embodiments, the control interface 50 includes an input device 52 and an output device 54, configured to interact with and/or operate the brazing system 10. For example, in various embodiments, the input device 52 comprises, for example, a keyboard, mouse, touch screen, etc. for inputting commands, directions, instructions, and/or the like to the brazing system 10. In various embodiments, the input device 52 is configured to allow an operator to control the vision system 20, the braze dispenser 30, and/or the robot 40. In various embodiments, the output device 54 comprises, for example, a display. In various embodiments, the output device 54 is configured to allow the operator to view images from the vision system 20.

In various embodiments, the control interface 50 of the brazing system 10 is configured to allow an operator to control and/or positon the vision system 20, the braze dispenser 30, and/or the robot 40.

In various embodiments, the control interface 50 is configured to allow an operator to control movement, orientation, and/or position of the substrate that the robot 40 brings to the brazing system 10, including proximate to the vision system 20 and/or braze dispenser 30.

In various embodiments, the control interface 50 is configured to allow the operator to control the braze head 32 and braze nozzle 34 through the braze processor module 36. For example, in various embodiments, an operator can control the type of braze material flowing through the braze dispenser 30. In various embodiments, an operator can control the flow rate of the braze material flowing through the braze dispenser 30, such as monitoring and/or controlling a flow rate of the braze material through the braze nozzle 34.

In various embodiments, a flow rate of the braze material through the braze nozzle 34 is approximately 0.011-0.11 pounds (5-50 grams) per minute, such as approximately 0.055 pounds (25 grams) per minute.

In various embodiments, an application rate of the braze material through the braze nozzle 34 is approximately 0.008-0.016 inches (0.2-0.4 millimeters) per pass, such as approximately 0.012 inches (0.3 millimeters) per pass.

In various embodiments, a thickness of the applied braze material is at least 0.01 inches (0.254 millimeters). For example, in various embodiments, a thickness of the applied braze material is approximately 0.01-0.06 inches (0.254-1.524 millimeters), such as approximately 0.035 inches (0.9 mm).

In various embodiments, the braze nozzle 34 does not contact the substrate, but instead stays a suitable distance from the substrate when the braze material is being dispensed. For example, in various embodiments, the braze dispenser applies the braze material at a distance of approximately 0.049-0.059 inches (1.25-1.5 millimeters) away from the substrate, such as approximately 0.054 inches (1.372 mm) away from the substrate.

In various embodiments, the processing module 60 of the brazing system 10 communicates with and controls the vision system 20, the braze dispenser 30, the robot 40, and/or the control interface 50, as described herein. More specifically, the processing module 60, in various embodiments, includes one or more controllers 62 (e.g., processors) and one or more tangible, non-transitory memories 64 capable of implementing digital or programmatic logic. In various embodiments, for example, the one or more controllers 62 are one or more of an application specific integrated circuit (ASIC), digital signal processor (DSP), field programmable gate array (FPGA), general purpose processor, and/or other programmable logic device, discrete gate, transistor logic, or discrete hardware components, or any various combinations thereof or the like, and the one or more memories 64 store instructions that are implemented by the one or more controllers 62 for performing various functions, such as controlling the brazing system 10 as described herein. As such, the brazing system 10 is, in various embodiments, an auto-adaptive brazing dispensing system operative in response to various control and/or electronic signals. In various embodiments, the brazing system 10 operates in an automated and/or semi-automated fashion.

In various embodiments, the brazing system 10 is configured to only operate if a locking mechanism is engaged, such as a closing and/or locking a door of the brazing system 10 before and/or during a brazing application.

In various embodiments, the brazing system 10 is configured to only operate if the substrate is loaded into the brazing system 10 in a predetermined way. For example, in various embodiments, the robot 40 is configured to only operate if the substrate is loaded into the brazing system 10 in a predetermined way. If the substrate is not loaded into the brazing system 10 in a predetermined way, then the brazing system 10, braze dispenser 30, and/or robot 40 are configured to not operate, in various embodiments.

In various embodiments, the brazing system 10 is programmed to know the number of substrates to which a brazing application is to be made.

In various embodiments, the vision system is programmed to recognize different types of substrates.

In various embodiments, the brazing system 10 is programmed to make different brazing applications to different substrates and/or different types of substrates.

In various embodiments, the robot 40 is configured to not make an incorrect braze application to a particular substrate.

In various embodiments, the brazing system 10 is configured to operate only if an expected substrate is recognized by the vision system 20 and/or configured to not operate without a substrate being within the brazing system 10.

In various embodiments, the brazing system 10 is configured to only make a braze application at a specified location on the substrate and/or to not make a braze application at an unspecified location on the substrate.

In various embodiments, the braze dispenser 30 is programmed to apply a predetermined braze material at a predetermined location, to apply a predetermined mass of a braze material at a predetermined location, to operate with a particular density of braze material, to operate with a predetermined end effector to apply the braze, to operate with a predetermined braze material deposition rate, to perform a self-test and/or periodic self-tests on a sample substrate, etc.

Figure 3:
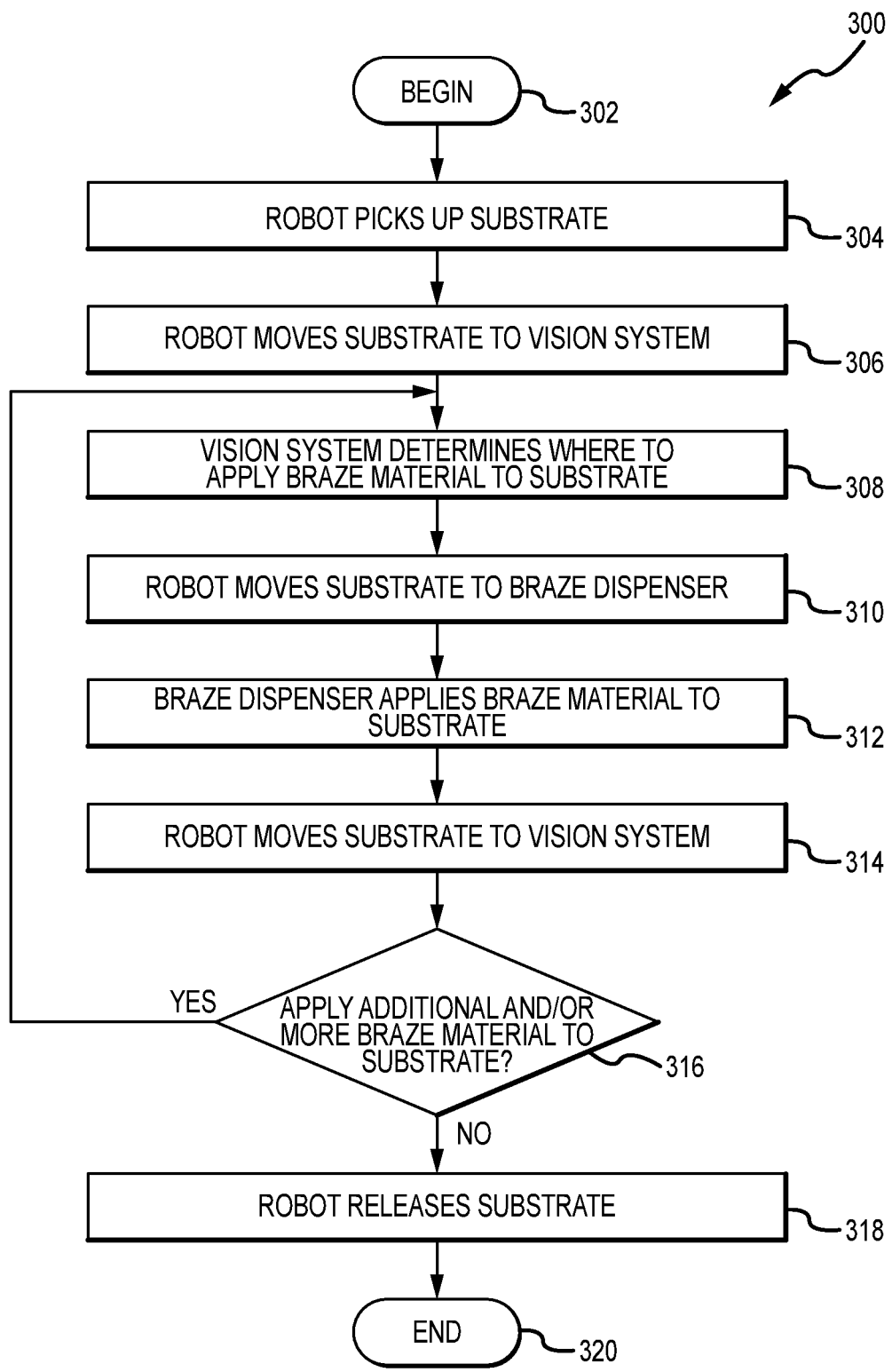
FIG. 3 is a flow chart of a brazing method, in various embodiments.

Referring now to FIG. 3, a method 300 begins at a step 302. Thereafter, a robot picks up a substrate at a step 304—such as picking up a fixture holding a substrate preloaded into the fixture, in various embodiments. Thereafter, the robot moves the substrate to a vision system at a step 306—such as moving the substrate to within operable proximity of the vision system. Thereafter, the vision system determines where to apply a braze material to the substrate at a step 308—such as by identifying cracks or holes of the substrate by comparison against expected parameters. Thereafter, the robot moves the substrate to a braze dispenser at a step 310—such as moving the substrate to within operable proximity of the braze dispenser. Thereafter, the braze dispenser applies a braze material to the substrate at a step 312—such as applying the braze material to the substrate in the amounts and/or at the locations identified by the vision system. Thereafter, the robot moves the substrate to the vision system at a step 314—such as moving the substrate back to within operable proximity of the vision system. Thereafter, the vision system identifies if additional and/or more braze material should be applied to the substrate at a step 316. If additional and/or more braze material should be applied to the substrate, the method 300 returns control to step 308 at step 316. Otherwise, the robot releases the substrate at a step 318 following step 316—such as discharging the substrate from the robot. Thereafter, the method 300 ends at a step 320.

Figure 4:
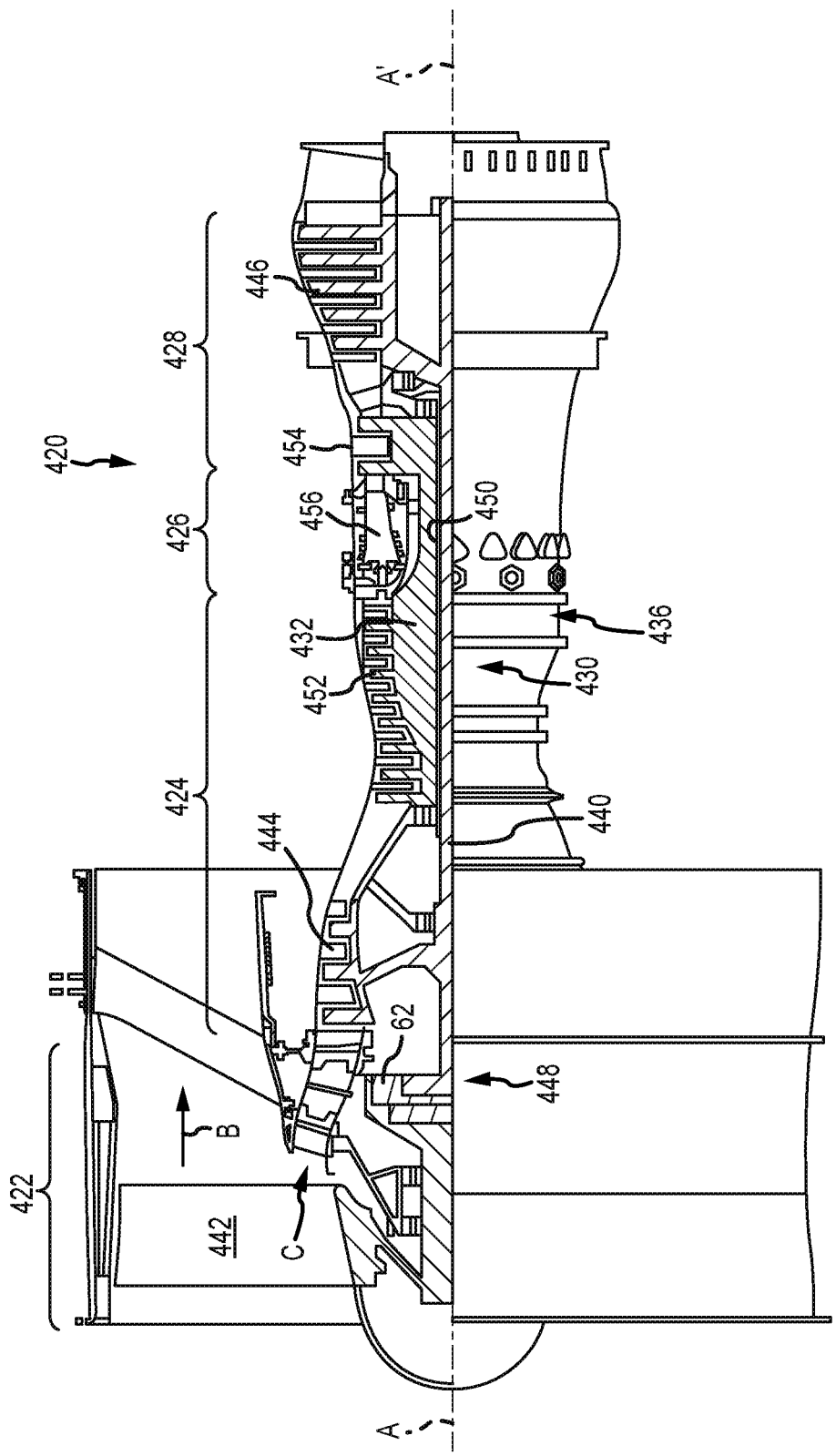
FIG. 4 is a simplified cross-sectional side view of an exemplary gas turbine engine, in various embodiments.

Referring now to FIG. 4, a representative gas turbine engine 420 is a two-spool turbofan that incorporates a fan section 422, a compressor section 424, a combustor section 426, and a turbine section 428. In various embodiments, the gas turbine engine 420 includes other systems and features too.

In various embodiments, the fan section 422 is positioned towards a front or inlet of the gas turbine engine 420, and it includes a fan 442 that induces air from a surrounding environment into the gas turbine engine 420 and accelerates a portion of the air towards the compressor section 424.

In various embodiments, the fan section 422 drives the air along a bypass flowpath B while the compressor section 424 drives the air along a core flowpath C for acceleration, compression, and communication into the combustor section 426, then expansion through the turbine section 428.

In various embodiments, the compressor section 424 raises the pressure of the air received from the fan section 422 to a relatively high level. The compressed air from the compressor section 424 then enters the combustor section 426, where one or more fuel nozzles inject fuel into the compressed air. The fuel-air mixture is ignited in the combustor section 426 to generate combustion gases. The high-energy combustion gases from the combustor section 426 then flow into and through the turbine section 428, thereby causing rotationally mounted turbine blades to rotate and generate energy. The air exiting the turbine section 428 is exhausted from the gas turbine engine 420 via an exhaust section.

In various embodiments, the gas turbine engine 420 includes one or more of a low pressure compressor (LPC) 444, a high pressure compressor (HPC) 452, a high pressure turbine (HPT) 454, and/or a low pressure turbine (LPT) 446.

In various embodiments, the gas turbine engine 420 is or includes other types of engines, such as turbojets, turboshafts, three-spool (plus fan) turbofans, and/or direct drive turbofans. In various embodiments, an intermediate spool includes an intermediate pressure compressor (not shown) between the LPC 444 and the HPC 452 and/or an intermediate pressure turbine (not shown) between the HPT 454 and the LPT 446.

In various embodiments, the gas turbine engine 420 includes a low spool 430 and a high spool 432 mounted for rotation about an engine central longitudinal axis A-A' relative to an engine static structure or engine case 436 via multiple bearing structures. In various embodiments, the low spool 430 includes an inner shaft 440 that interconnects the fan 442 of the fan section 422, the LPC 444 of the compressor section 424, and the LPT 446 of the turbine section 428. In various embodiments, the inner shaft 440 communicates with the fan 442 directly or through a geared architecture 448 to drive the low spool 430 at a higher speed than the fan 442. In various embodiments, a reduction transmission is an epicyclic transmission, such as a planetary or star gear system.

In various embodiments, the high spool 432 includes an outer shaft 450 that interconnects the HPC 452 of the compressor section 424 and the HPT 454 of the turbine section 428. In various embodiments, a combustion chamber 456 is arranged between the HPC 452 and the HPT 454. In various embodiments, the inner shaft 440 and the outer shaft 450 are concentric and rotate about the engine central longitudinal axis A-A' that is collinear with their longitudinal axes. Core airflow flowing along core flowpath C is compressed by the LPC 444, further compressed by the HPC 452, mixed with fuel, burned in the combustion chamber 456, and then expanded over the HPT 454 and the LPT 446. In various embodiments, the HPT 454 and the LPT 446 rotationally communicate with the high spool 432 and the low spool 430, respectively, in response to the expansion.

In various embodiments, the gas turbine engine 420 is a high-bypass geared aircraft engine. In various embodiments, the gas turbine engine 420 bypass ratio is greater than approximately 6:1. In various embodiments, the geared architecture 448 includes an epicyclic gear train, such as a planetary gear system or other gear system. In various embodiments, the example epicyclic gear train has a gear reduction ratio of greater than approximately 2.3:1, and, in other embodiments, it is greater than approximately 2.5:1. In various embodiments, the geared turbofan enables operation of the low spool 430 at higher speeds that can increase the operational efficiency of the LPC 444 and the LPT 446 and render increased pressure in a fewer number of stages.

A pressure ratio associated with the LPT 446 is pressure measured prior to the inlet of the LPT 446 as related to the pressure at the outlet of the LPT 446 prior to an exhaust nozzle of the gas turbine engine 420. In various embodiments, the bypass ratio of the gas turbine engine 420 is greater than approximately 10:1, the fan 442 diameter is significantly larger than that of the LPC 444, and the LPT 446 has a pressure ratio that is greater than approximately 5:1.

In various embodiments, a significant amount of thrust is provided by the bypass flowpath B due to the high bypass ratio. In various embodiments, the fan section 422 is suited for a particular flight condition—e.g., cruising at approximately 0.8 Mach and/or approximately 35,000 feet (10,668 meters). This flight condition, with the gas turbine engine 420 at a preferred fuel consumption, is known as thrust specific fuel consumption (TSFC), which is an industry-standard parameter of fuel consumption per unit of thrust.

Fan pressure ratio is a pressure ratio across a blade of the fan 442 in the fan section 422 without using a fan exit guide vane system. In various embodiments, a low fan pressure ratio of the gas turbine engine 420 is less than 1.45. A low corrected fan tip speed is the actual fan tip speed divided by an industry-standard temperature correction of $(T/518.7)^{0.5}$, in which T is an ambient temperature measurement in degrees Rankine. In various embodiments, the low corrected fan tip speed of the gas turbine engine 420 is less than approximately 1,150 feet (351 meters) per second.

In various embodiments, the combustion chamber 456 contains the combustion products that flow axially toward the turbine section 428. In various embodiments, an outer wall and/or an inner wall are generally cylindrical and extend circumferentially about the engine central longitudinal axis A-A'. In various embodiments, one or more of the outer wall and/or the inner wall are formed utilizing shells and panels. In various embodiments, the shells and/or panels are circumferentially continuous (e.g., ring shaped) and divided axially, divided circumferentially from each, and/or both (e.g., substantially rectilinear in shape).

In various embodiments, the inventive arrangements can be applied to any of the afore-mentioned engine components, including, for example, airfoils, blades, buckets, combustors, nozzles, shrouds, vanes, walls, etc.

Referring now to FIG. 5, a representative substrate 500 is depicted, which can be a component of a gas turbine engine, such as depicted in FIG. 4, to which a braze application is to be made. For example, the substrate 500 could be on airfoil, related to platform holes of a vane structure, etc. In various embodiments, the substrate 500 is carried on a holding tray 502 or the like for transportation by the robot 40 of FIGS. 1-2 to and/or within the vision system 20 of FIGS. 1-2. In various embodiments, the holding tray 502 (or substrate 500) includes an identifier 504 such as a bar code or the like that the vision system 20 of FIGS. 1-2 is programmed to recognize.

Technical benefits and effects of this disclosure include providing braze dispensing systems and methods for applying a braze material to a substrate, such as from a gas turbine engine, an aircraft gas turbine engine, etc., to improve the usability and/or re-usability thereof, including if a substrate has a crack or hole, allowing a flowed braze material to meet or exceed quality and/or standards of the component following the braze application, thereby reducing production costs, allowing re-works, extending the working life of various components, etc.

Advantages, benefits, and/or solutions to problems have been described herein with regard to specific embodiments. Furthermore, connecting lines shown in the various figures contained herein are intended to represent exemplary functional relationships and/or physical couplings between the various elements. It should be noted that many additional and/or functional relationships or physical connections may be present in a practical system. However, the advantages, benefits, and/or solutions to problems, and any elements that may cause any advantage, benefit, and/or solution to occur or become more pronounced are not to be construed as critical, essential, and/or required elements or features of this disclosure.

The scope of this disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural, and vice-versa. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts, but not necessarily to denote the same or different materials. Like depictions and/or numerals also generally represent like elements.

The steps recited in any of the method or process descriptions may be executed in any order and are not necessarily limited to the order presented. Furthermore, any reference to singular elements, embodiments, and/or steps includes plurals thereof, and any reference to more than one element, embodiment, and/or step may include a singular one thereof. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, fixed, connected, or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas, but not necessarily to denote the same or different materials. In some cases, reference coordinates may or may not be specific to each figure.

Systems, methods, and apparatus are provided herein. In the detailed description herein, references to "one embodiment," "an embodiment," "various embodiments," etc., indicate that the embodiment described may include a particular characteristic, feature, and/or structure, but every embodiment may not necessarily include this particular characteristic, feature, and/or structure. Moreover, such phrases are not necessarily referring to the same embodiment. Further, when a particular characteristic, feature, and/or structure is described in connection with an embodiment, it is submitted that it is within the knowledge of one skilled in the art to affect such characteristic, feature, and/or structure in connection with other embodiments, whether or not explicitly described. After reading the description, it will be apparent to one skilled in the relevant art(s) how to implement this disclosure in alternative embodiments.

Furthermore, no component, element, or method step in the present disclosure is intended to be dedicated to the public regardless of whether the component, element, or method step is explicitly recited in the claims. No claim element is intended to invoke 35 U.S.C. § 112(f) unless the element is expressly recited using the phrase "means for." As used herein, the terms "comprises," "comprising," or any other variation thereof, are intended to cover a non-exclusive inclusion, such that an apparatus, article, method, and/or process, method that comprises a list of elements does not include only those elements, but it may also include other elements not expressly listed or inherent to such apparatus, article, method, and/or process.

What is claimed is:

1. A brazing system, comprising:
   a vision system having a camera, a sensor, and a vision processor module;
   a braze dispenser having a braze head, a braze nozzle, and a braze processor module; a robot having an articulating arm; a control interface having an input device and an output device; and
   a processing module having a controller and memory configured to communicate with and control the vision system, the braze dispenser, the robot, and the control interface;
   wherein the vision system is configured to identify an identifier for the substrate, determine where the braze dispenser is to apply a braze material to a substrate, and whether the braze dispenser is to apply additional braze material to the substrate after an initial application; and
   wherein the processing module is configured to identify an expected configuration based on the identifier, identify a crack or hole in the substrate based on the expected configuration of the substrate, and determine a first location to apply the braze material based on identifying the crack or hole.

2. The brazing system of claim 1, wherein the processing module is configured to receive commands from the input device to communicate with and control the vision system, the braze dispenser, and the robot.

3. The brazing system of claim 2, wherein the processing module is configured to communicate with and control the articulating arm of the robot.

4. The brazing system of claim 3, wherein the processing module is configured to communicate with and control the articulating arm of the robot to place the substrate proximate the vision system.

5. The brazing system of claim 3, wherein the processing module is configured to communicate with and control the articulating arm of the robot to place the substrate proximate the braze dispenser.

6. The brazing system of claim 1, wherein the processing module is configured to communicate with and control the braze dispenser to apply the braze material to the substrate based on determinations from the vision system.

7. The brazing system of claim 1, wherein the substrate is a component of a gas turbine engine.

8. The brazing system of claim 7, wherein the gas turbine engine is configured for use in an aircraft.

* * * * *